United States Patent
Ashworth et al.

(10) Patent No.: US 9,321,364 B1
(45) Date of Patent: Apr. 26, 2016

(54) HEATED CHARGING INTERFACE OF ELECTRIC VEHICLE

(71) Applicant: Proterra Inc., Greenville, SC (US)

(72) Inventors: Taylor A. Ashworth, Greenville, SC (US); Seamus T. McGrath, Simpsonville, SC (US); Seneca A. Schepmann, Greenville, SC (US)

(73) Assignee: Proterra Inc., Greenville, SC (US)

( * ) Notice: Subject to any disclaimer, the term of this patent is extended or adjusted under 35 U.S.C. 154(b) by 0 days.

(21) Appl. No.: 14/788,060

(22) Filed: Jun. 30, 2015

(51) Int. Cl.
| | |
|---|---|
| *B60L 11/18* | (2006.01) |
| *B60R 16/033* | (2006.01) |
| *H05B 3/18* | (2006.01) |
| *H05B 3/12* | (2006.01) |
| *B60L 5/02* | (2006.01) |

(52) U.S. Cl.
CPC ............... *B60L 11/1818* (2013.01); *B60L 5/02* (2013.01); *B60R 16/033* (2013.01); *H05B 3/12* (2013.01); *H05B 3/18* (2013.01)

(58) Field of Classification Search
None
See application file for complete search history.

(56) References Cited

U.S. PATENT DOCUMENTS

| | | | | |
|---|---|---|---|---|
| 3,752,348 | A * | 8/1973 | Dickason | B32B 17/10036 219/203 |
| 5,198,638 | A * | 3/1993 | Massacesi | B60R 16/04 219/209 |
| 5,291,388 | A | 3/1994 | Heinrich et al. | |
| 5,293,947 | A | 3/1994 | Stratton et al. | |
| 5,365,153 | A | 11/1994 | Fujita et al. | |
| 5,504,414 | A | 4/1996 | Kinoshita et al. | |
| 5,867,000 | A | 2/1999 | Thornton | |
| 6,023,137 | A | 2/2000 | Kumar et al. | |
| 6,184,496 | B1 * | 2/2001 | Pearce | E01C 11/265 219/202 |
| 6,281,649 | B1 | 8/2001 | Ouellette et al. | |
| 6,421,600 | B1 * | 7/2002 | Ross | B60L 5/005 180/167 |
| 7,185,591 | B2 | 3/2007 | Kumar et al. | |
| 7,690,456 | B2 | 4/2010 | Deng et al. | |
| 7,733,039 | B2 | 6/2010 | Su et al. | |
| 7,783,400 | B1 * | 8/2010 | Zimler | B60S 1/026 219/202 |
| 7,960,857 | B2 | 6/2011 | King et al. | |

(Continued)

FOREIGN PATENT DOCUMENTS

| | | |
|---|---|---|
| WO | WO-2011-079215 | 6/2011 |
| WO | WO-2011-121052 | 10/2011 |

(Continued)

OTHER PUBLICATIONS http://www.electronicsprotectionmagazine.com/images/ATS-2.pdf; "Spreading Thermal Resistance; Its Definition and Control"; Qpedia, Published by Advanced Thermal Solutions, Inc., 89-27 Access Road Norwood, MA 02062; pp. 13-17.

*Primary Examiner* — Rexford Barnie
*Assistant Examiner* — David Shiao
(74) *Attorney, Agent, or Firm* — Bookoff McAndrews, PLLC

(57) ABSTRACT

An electric bus may include a charging interface positioned on an external surface of the electric bus. One or more heating pads may be removably attached to the charging interface and configured to heat the charging interface. The heating pads may include a rigid plate forming an exposed surface of the charging interface. The plate may be positioned such that a first side of the plate forms a charging head contact surface when the charging head engages with the charging interface. A heating device may be attached to a second side of the plate opposite the first side. The heating device may include a heating element configured to heat the plate by resistive heating.

20 Claims, 5 Drawing Sheets

(56) References Cited

U.S. PATENT DOCUMENTS

| | | | |
|---|---|---|---|
| 8,008,876 B2 | 8/2011 | Yonemori et al. | |
| 8,030,884 B2 | 10/2011 | King | |
| 8,037,954 B2 * | 10/2011 | Taguchi | B60H 1/00257 165/10 |
| 8,049,460 B2 * | 11/2011 | Krauer | B60L 11/1875 320/104 |
| 8,324,858 B2 | 12/2012 | Hill et al. | |
| 8,453,773 B2 | 6/2013 | Hill et al. | |
| 8,760,116 B2 * | 6/2014 | Fujii | B60L 1/04 219/202 |
| 8,829,853 B2 | 9/2014 | Hill et al. | |
| 2001/0025839 A1 * | 10/2001 | Jones | E04D 13/103 219/213 |
| 2006/0250902 A1 | 11/2006 | Bender et al. | |
| 2009/0206068 A1 * | 8/2009 | Ishizeki | H05B 3/84 219/203 |
| 2009/0243538 A1 | 10/2009 | Kelty et al. | |
| 2010/0013438 A1 | 1/2010 | Anwar | |
| 2010/0025131 A1 | 2/2010 | Gloceri et al. | |
| 2010/0225258 A1 | 9/2010 | Namuduri et al. | |
| 2011/0031051 A1 | 2/2011 | George et al. | |
| 2011/0089887 A1 | 4/2011 | Ward et al. | |
| 2011/0100735 A1 | 5/2011 | Flett et al. | |
| 2011/0198141 A1 | 8/2011 | Clark et al. | |
| 2013/0181679 A1 | 7/2013 | Naylor | |
| 2013/0193918 A1 * | 8/2013 | Sarkar | B60L 3/04 320/109 |
| 2013/0221918 A1 | 8/2013 | Hill et al. | |
| 2014/0070767 A1 | 3/2014 | Morris et al. | |
| 2015/0042278 A1 * | 2/2015 | Leary | B60L 11/1824 320/109 |
| 2015/0115889 A1 * | 4/2015 | Rill | B60L 11/1818 320/109 |

FOREIGN PATENT DOCUMENTS

| | | |
|---|---|---|
| WO | WO-2011-139675 | 11/2011 |
| WO | WO-2014078456 | 5/2014 |

* cited by examiner

HEATED CHARGING INTERFACE OF ELECTRIC VEHICLE

TECHNICAL FIELD

The current disclosure relates to systems and methods of heating the charging interface of an electric vehicle.

BACKGROUND

An electric vehicle (EV) uses an electric motor (or traction motor) for propulsion. Electric vehicles may include all-electric vehicles where the electric motor is the sole source of traction power, and hybrid electric vehicles that include an auxiliary power source in addition to the electric motor. In an electric vehicle, energy may be stored in one or more batteries to power the electric motor. When the stored energy decreases, the batteries may be recharged by connecting the vehicle to a power supply. Traditionally, charging an EV required the driver to park the vehicle and connect high voltage cables from the charger to a charging port in the vehicle. Such a charging method may be time intensive and may not be suitable for some applications. In some applications, to minimize charging time, the vehicle may automatically dock with and recharge its batteries at charging stations provided along its route. During docking, electrodes on the vehicle electrically connect with electrodes of the charging station to transfer power to the batteries.

In some operating conditions, snow and ice (collectively referred to herein as ice) may accumulate on the electrodes of the vehicle during operation. The accumulated ice may adversely affect the formation of a good electrical contact between the vehicle and the charging station. Embodiments of the current disclosure may alleviate the problems discussed above and/or other problems in the art. The scope of the current disclosure, however, is defined by the attached claims, and not by the ability to solve any specific problem.

SUMMARY

Embodiments of the present disclosure relate to, among other things, systems and methods of heating a charging interface of electric vehicles. Each of the embodiments disclosed herein may include one or more of the features described in connection with any of the other disclosed embodiments In one aspect, an electric bus is disclosed. The electric bus may include a charging interface positioned on an external surface of the electric bus. The charging interface may be configured to engage with a charging head of an external charging station to charge the bus. One or more heating pads may be removably attached to the charging interface and configured to heat the charging interface. The heating pads may include a rigid plate forming an exposed surface of the charging interface. The plate may be positioned such that a first side of the plate forms a charging head contact surface when the charging head engages with the charging interface. A heating device may be attached to a second side of the plate opposite the first side. The heating device may include a heating element configured to heat the plate by resistive heating.

In another aspect, an electric bus is disclosed. The electric bus may include a charging interface positioned on a roof of the bus. One or more heating pads may be removably attached to the charging interface and configured to heat the charging interface. The heating pads may include a metal plate having a first side and a second side opposite the first side. The first side may be a surface exposed to atmosphere. A heating device may be attached to the second side of the plate. The heating device may include a polymer encapsulated resistive heating element. A control system may be configured to selectively operate the one or more heating pads to melt ice on the charging interface when an ambient temperature is below a threshold value.

In another aspect, a method of operating an electric bus is disclosed. The electric bus may include a charging interface on a roof and a heating pad removably attached to the charging interface. The heating pad may include a metal plate having a first side exposed to atmosphere and an opposite second side with a polymer encapsulated heating element attached thereto. The method may include detecting an ambient temperature and activating the heating pad to heat the charging interface when the detected ambient temperature is below a threshold value.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION

The present disclosure describes systems and methods for heating the charging interface of an electric vehicle. While principles of the current disclosure are described with reference to an electric bus, it should be understood that the disclosure is not limited thereto. Rather, the systems and methods of the present disclosure may be used to heat components in any application.

Figure 1:
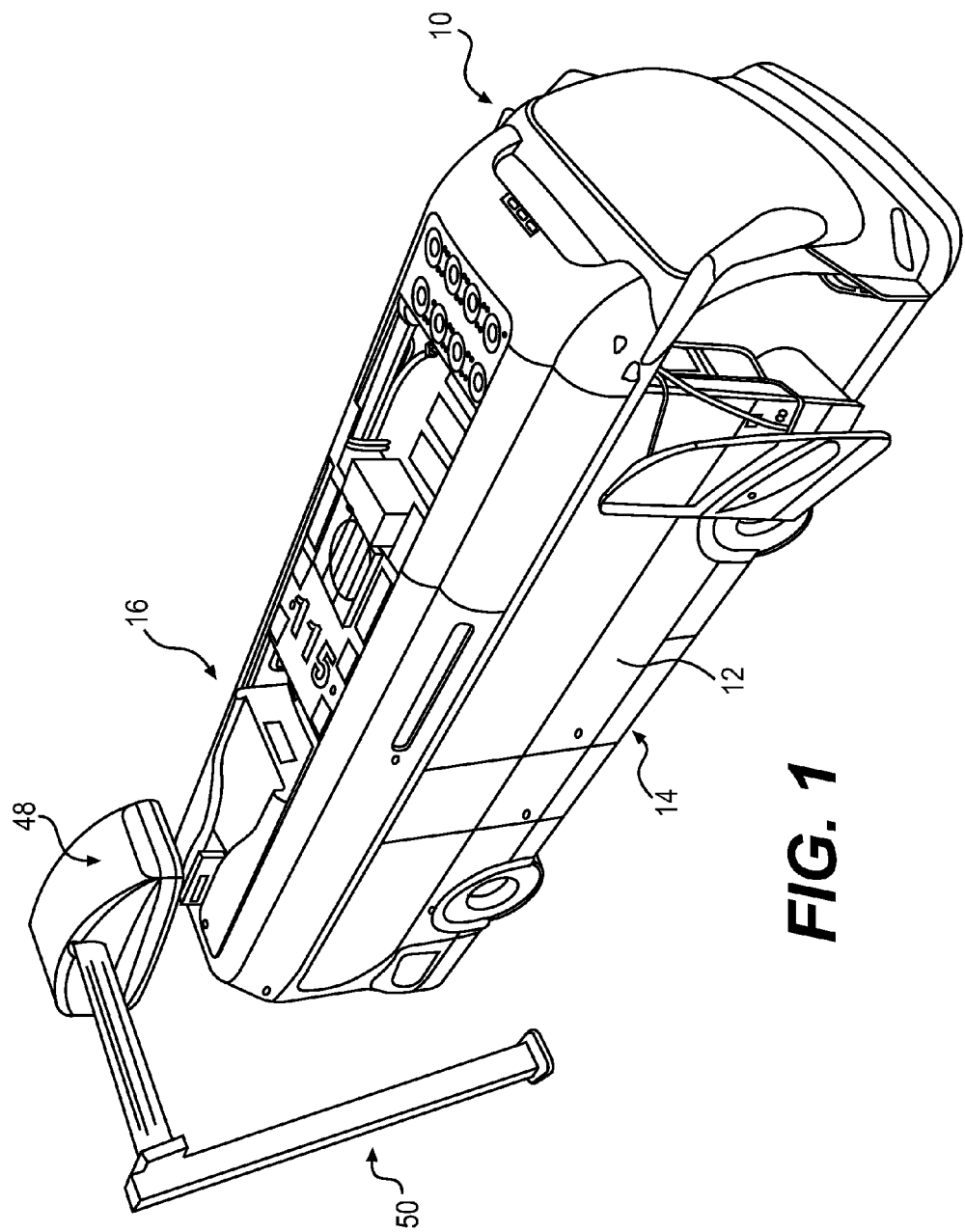
FIG. 1 shows an exemplary bus about to engage with an external charging station.

FIG. 1 illustrates an electric vehicle in the form of an electric bus 10 about to engage with a charging head 48 of an external charging station 50 for charging. Electric bus 10 may include a body 12 enclosing a space for passengers. In some embodiments, some (or all) parts of body may be fabricated using one or more composite materials to reduce the weight of bus 10. In some embodiments, bus 10 may be a low-floor electric bus. As is known in the art, in a low-floor bus, there are no stairs at the front and/or the back doors of the bus. In such a bus, the floor is positioned close to the road surface to ease entry and exit into the bus. In some embodiments, the floor height of the low-floor bus may be about 12-16 inches (30.5-40.6 cm) from the road surface. In this disclosure, the term "about" is used to indicate a possible variation of ±10% in a stated numeric value. Bus 10 may include an electric powertrain (not shown) with an electric motor powered by one or more batteries 14. The batteries 14 may store electrical energy to power the motor.

The batteries 14 may have any structure and chemistry. In some embodiments, the batteries may be lithium titanate oxide (LTO) batteries. In some embodiments, the batteries 14 may be nickel manganese cobalt (NMC) batteries. The LTO batteries may be fast charge batteries that may allow the bus 10 be recharged to substantially its full capacity in a small amount of time (e.g., about ten minutes or less). Due to its higher charge density, NMC batteries may take longer to charge to a comparable SOC, but NMC batteries may retain a larger amount of charge and thus increase the range of the bus 10. It is also contemplated that, in some embodiments, the batteries 14 may include other or multiple different chemistries. For instance, some of the batteries 14 may be LTO or NMC batteries, while other batteries may have another chemistry (for example, lead-acid, nickel cadmium, nickel metal hydride, lithium ion, zinc air, etc.).

In some embodiments, batteries 14 may be configured as a plurality of strings of battery packs connected in parallel. Each battery pack may include a plurality of battery modules connected in series or parallel and enclosed in an enclosure. And, each battery module may include a plurality of battery cells connected in series. In some embodiments, bus 10 may include 1-4 battery strings connected in parallel, with each string comprising 2-10 battery packs connected in series. In some embodiments, each battery pack may include 80-200 battery cells connected in series. Configuring the batteries 14 as parallel connected strings allows the bus 10 to continue operating with one or more strings disconnected if a battery pack (or a battery cell) in a string fails or experiences a problem. The batteries 14 may be positioned anywhere on the bus 10. In some embodiments, some or all of the batteries 14 (e.g., battery packs) may be positioned under the floor of the bus 10 (e.g., in cavities formed under the floor). Some possible battery chemistries and configurations are described in commonly assigned U.S. Pat. No. 8,453,773 which is incorporated herein by reference in its entirety.

Bus 10 may include a charging interface 16 that is adapted to engage with the charging head 48 of an external charging station 50 to recharge the batteries 14. The charging station 50 may be provided at any location (bus depot, road side, etc.) and may be powered by an electric utility grid. In some embodiments, bus 10 may be a transit bus that operates along a fixed route (airport, university campus, city, town, county, etc.) in a geographic area. That is, bus 10 may operate along its fixed route picking up and dropping off passengers at several bus stops along the route. In some such embodiments, the charging stations 50 may be provided in some of these bus stops so that a bus 10 may be recharged while passengers are loaded or unloaded. In some embodiments, bus 10 may be a long-haul bus that travels between two remote locations (towns, cities, etc.). In some such embodiments, charging stations 50 may be provided at one or both the origination and destination locations to charge the bus at the beginning and end of its route. The charging head 48 may be attached to the charging station 50 such that the charging head 48 may overhang bus 10 positioned by the charging station 50. Details of the charging head 48 and the interfacing of the charging head 48 with the charging interface 16 of the bus 10 are described in commonly assigned patent applications US 2013/0193918 A1, US 2014/0070767 A1, and WO 2014/078456 A1 each of which are incorporated by reference in their entirety herein.

Figure 2:
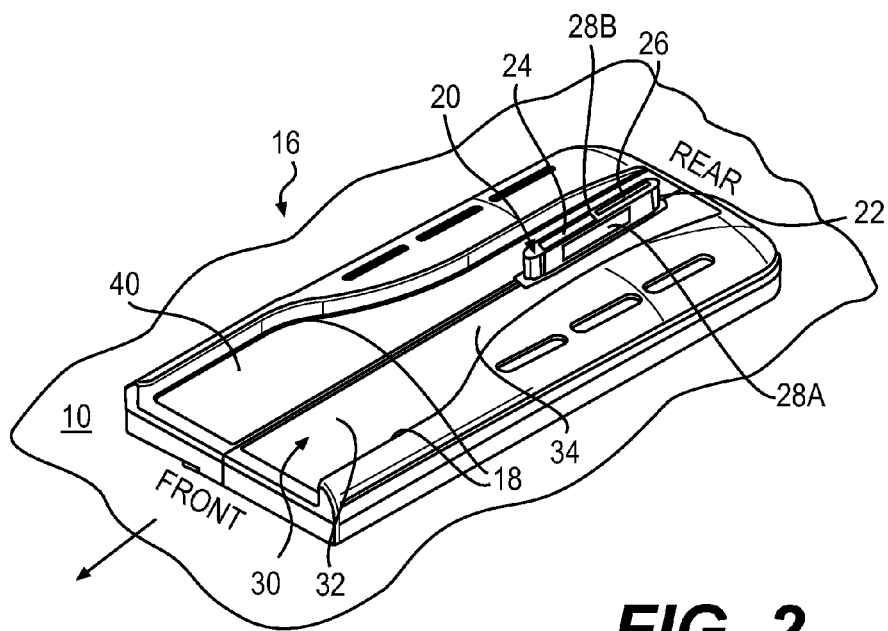
FIG. 2 is an exemplary charging interface of the bus of FIG. 1.

The charging interface 16 may be provided on the roof of the bus 10 to interface with the charging head 48 of the charging station 50. FIG. 2 illustrates an enlarged view of the charging interface 16 on the roof of the bus 10. In the description below, reference will be made to both FIGS. 1 and 2. Charging interface 16 may include an alignment scoop 18 and a charging blade 20 mounted on a landing surface 30. The alignment scoop 18 may include opposing curved rails (or surfaces) that define a funnel-shaped region in the landing surface 30. The landing surface 30 may include a landing zone 32 positioned towards the front of the charging interface 16 and a chute 34 positioned closer to the blade 20. As indicated using text in FIG. 2, the charging interface 16 is oriented on the roof such that the charging blade 20 is positioned towards the back of the bus 10. As the bus 10 pulls up under a charging station 50 and moves in the direction of the arrow, the charging head 48 of the charging station 50 may land on the landing zone 32 and move towards, and engage with, the charging blade 20. That is, the charging head 48 may automatically engage with the charging interface 16 of the bus 10 when the bus 10 is positioned below the charging head 48. The alignment scoop 18 may act as a funnel to direct the charging head 48 through the narrower chute 34 towards the charging blade 20. The converging shape of the alignment scoop 18, and the play of the charging head 48, accommodates lateral misalignment of the bus 10 with the charging head 48, and enables the charging head 48 to repeatably interface with the charging interface 16. Thus, the alignment scoop 18 serves as an alignment feature that assists in repeatable engagement of the charging head 48 with the charging interface 16.

The charging blade 20 may protrude vertically upwards from the landing surface 30 and house one or more electrodes electrically separated by an insulating base 22. These electrodes may include first and second electrodes 28A, 28B positioned on either side of the charging blade 20 and connected to opposite poles of batteries 14. When the charging head 48 mates with the charging blade 20, electrodes in the charging head 48 mate with the first and second electrodes 28A, 28B and transfer power to the batteries 14. The electrodes may also include a pilot electrode 26 and a ground electrode 24 positioned on the top surface of charging blade 20. The ground electrode 24 may contact a ground terminal of the charging head 48 and be connected to a common ground. When the charging head 48 properly mates with charging blade 20, electrical contact between the pilot electrode 26 and a mating electrode on the charging head 48 may trigger a pilot signal. Upon receipt of the pilot signal, current may flow from the charging head 48 to the charging blade 20 to charge the bus 10 (i.e., batteries 14). In some embodiments, charging of the bus 10 may not be initiated until a pilot signal is detected.

The charging interface 16 may enclose components that are adapted to receive the high voltage current from the charging station 50 and convert it to a form that may be received by the batteries 14. In some embodiments, these components may be positioned below the charging interface 16, and the charging interface 16 may be opened (e.g., like a door) to access these components. Although the charging interface 16 is described as being positioned on the roof of the bus 10, and the charging head 48 is described as being suspended above bus 10, this is not a requirement. In general, the charging interface 16 may be positioned anywhere on the bus 10 (such as, for example, a side surface of the bus 10), and the charging head may be positioned to mate with the charging interface.

Embodiments of charging interfaces 16 and charging stations 50 that may be used for bus 10 are described in commonly-assigned U.S. Pat. No. 8,829,853, US Patent Application Publication No. US 2014/0070767, and International Application Publication No. WO/2014/078456 each of which are incorporated by reference in their entirety herein. Further, although charging blade 20 is described as projecting upwards from landing surface 30, and the electrodes (24, 26, 28A, 28B) are described as being positioned on specific surfaces of the charging blade 20, this is not a requirement. In general, the charging blade 20 and the electrodes may have any configuration. For example, in some embodiments, the charging blade 20 may be a flat surface with the electrodes positioned thereon.

During operation of the bus in cold weather conditions, snow may deposit on, or ice may form (or deposit) on the charging interface 16 (such as on landing surface 30 and/or on the electrodes 24, 26, 28A, 28B). This snow and ice may interfere with the formation of good electrical contact between the charging interface 16 and the charging head 48. For example, ice on the pilot electrode 24 may prevent (or delay) the detection of electrical contact between the charging interface 16 and the charging head 48. Accumulated snow or ice on the landing surface 30 may also interfere with the movement of the charging head 48 as it lands on the landing zone 32 and slides towards the charging blade 20. The charging interface 16 may incorporate features to melt or soften the ice formed/deposited thereon. These features may include one or more heating pads 40 on the charging interface 16.

Figure 3:
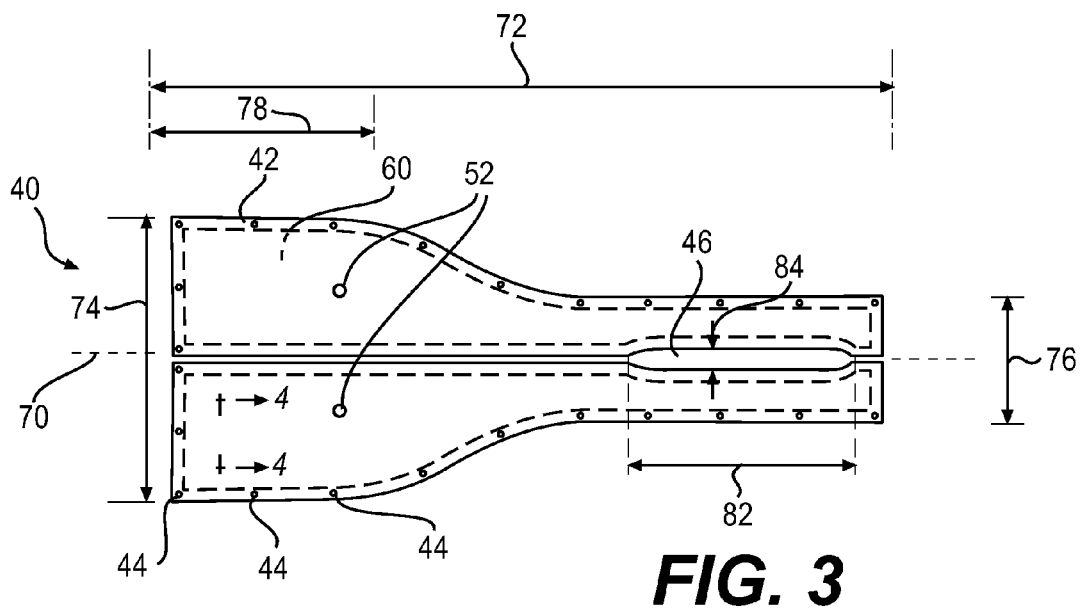
FIG. 3 is an exemplary heating pad in the charging interface of FIG. 2.
Figure 4:
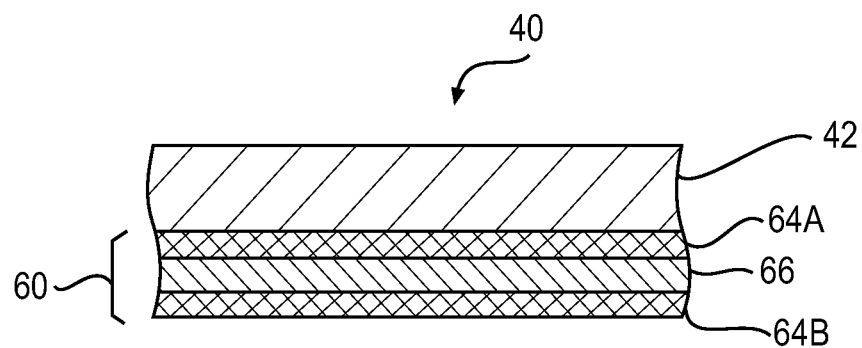
FIG. 4 is a cross-sectional view of the heating pad of FIG. 3.

FIG. 3 illustrates an exemplary embodiment in which two heating pads 40 are used to heat the charging interface 16. Although two heating pads 40 are illustrated in FIG. 3, as will be explained later, in general, any number of heating pads 40 (e.g., one, three, four, five, etc.) may be used on charging interface 16. FIG. 4 illustrates a partial cross-sectional view of a heating pad 40 along plane 4-4 identified in FIG. 3. In the discussion below, reference will be made to both FIGS. 3 and 4. Heating pad 40 may include a plate 42 with a heating device 60 attached thereto. The plate 42 may be formed of any thermally conductive material. In some embodiments, plate 42 may be made of anodized or bare aluminum. However, it is also contemplated that plate 42 may be made of other conductive metallic (e.g., stainless steel, copper, etc.) or nonmetallic (e.g., conductive plastics, ceramic, marble, etc.) materials that provides rigidity to the heating pad 40. The heating device 60 may be a polymer encapsulated heating element, with a central heating element 66 and polymer layers 64A and 64B on either side. The plate 42 and the polymer layers 64A, 64B may have any thickness. In some embodiments, the plate 42 may have a thickness between about 0.1 to 0.15 inches (about 0.25 to 0.38 cm) and the polymer layers 64A, 64B may have a thickness between about 0.025-0.075 inches (about 0.06 to 0.19 cm).

The heating element 66 may be made of any material configured to covert electricity to heat by resistive or Joule heating. Any material that is typically used to make resistive heating filaments may be used to make heating element 66 (e.g., nickel chromium alloys, copper nickel alloys, molybdenum disilicide, etc.). In some embodiments, heating element 66 may be configured as a filament or a foil that is arranged in a zig-zag (or another meandering) pattern to cover a desired area. The polymer layers 64A, 64B on either side of the heating element 66 may serve as waterproofing layers and prevent (or reduce) moisture from reaching the heating element 66. Any polymeric material, suitable for this purpose, may be used as polymer layers 64A, 64B. In some embodiments, the polymer layers 64A, 64B may be made of silicone rubber.

The heating element 66, polymer layers 64A, 64B, and the plate 42 may be attached together by any means (adhesive, etc.) to form heating pad 40. In some embodiments, the individual layers of material may be vulcanized together with the plate 42 to form a single integral heating pad 40. In some embodiments, for vulcanization, a heating element 66 sandwiched between uncured polymer sheets may be placed on plate 42, and the assembly placed in a vacuum oven and heated past the glass transition temperature ($T_g$) of the polymer. During vulcanization, the uncured polymer sheets crosslink with each other encapsulating the heating element 66 therebetween. As the assembly is heated past $T_g$, the softened polymer flows into and fills microcavities on the surface of the plate 44 to form a strong permanent bond. By vulcanizing the layers together, gaps and cavities (e.g., air holes, etc.) between the layers may be eliminated (or minimized), leading to a strong mechanical bond and good heat transfer properties.

The heating pad 40 may have any shape and size. In some embodiments, as illustrated in FIGS. 3 and 4, the heating pad 40 may have substantially the same shape and size as the landing surface 30 of the charging interface 16. That is, the heating pad 40 may have an outer profile substantially similar to that of the landing surface 30 with a cavity 46 for the charging blade 20 to pass through. In some embodiments, the heating pad 40 may be fabricated as multiple parts, which when assembled, may have substantially the same shape as the landing surface 30. For example, as illustrated in FIG. 3, the heating pad 40 may be formed as two parts, symmetric about a longitudinal axis 70, to enable the charging interface 16 to be opened (e.g., like a door).

The heating pad 40 may be placed on the charging interface 16 between the alignment scoop 18 with the charging blade 20 extending through the cavity 46. Making the profile of the heating pad 40 and the landing surface 30 to be substantially the same makes the assembly processes easier since the heating pad 40 will align itself naturally with the landing surface 30. The relatively stiff plate 42 of the heating pad 40 may also make handling and assembly of the heating pad 40 easier. For instance, during handling and assembly, the plate 42 may act as a relatively stiff backing for the heating pad, and prevent the heating pad 40 from folding or wrinkling. Folding or wrinkling of the heating pad 40 may cause cracking or other damage in the heating element 66 of the heating pad 40.

The heating pad 40 may be attached to the landing surface 30 such that the plate 42 forms an exposed top surface of the landing surface 30. During charging operations of the bus 10, the charging interface 48 may land and slide on the plate 42. Due to this interaction with the charging head 48, the plate 42 may be subject to high mechanical wear. Due to its relatively high stiffness and thickness, the plate 42 may enable the heating pad 40 to withstand this high mechanical wear. During adverse weather conditions, ice may also form on the top surface of the plate 42. The high thermal conductivity of the plate 42 may enable the ice to be heated quickly by the heating device 60 on the backside of the plate 42. In embodiments, where the heating element 66 is a filament or a strip heater, the relative size difference (i.e., in width) between each individual heating filaments (or strips) and the plate 42, causes relatively small areas proximate these filaments on the back side of the plate 42 to be heated. This localized heat on the back side of the plate 42 spreads radially outwards to cover a larger area as it travels (i.e., by conduction) through the plate thickness to the top surface of the plate 42. Thermal spreading resistance is a measure of how evenly this concentrated heat on the back side of the plate 42 spreads radially (in a transverse direction) as it moves to the top surface of the plate 42. See "Spreading Thermal Resistance; Its Definition and Control," Thermal Fundamentals, http://www.electronicsprotectionmagazine.com/images/ATS-2.pdf. The relatively high thermal conductivity and thickness of the plate may decrease the thermal spreading resistance of the plate 42, and thus allow the heat to spread substantially evenly over the entire surface of the plate 42. Thus, providing the plate 42 as the top surface of the heating pad 40 may also assist in melting the ice evenly over the heating pad 40.

Configuring the heating pad 40 to cover substantially the entire area of the landing surface 30 enables ice to be removed from the entire landing surface 30. In general, the size of the heating pad 40 may change with the size of the landing surface 30. In some embodiments, the heating pad 40 may have a length 72 of about 100-140 inches (about 254-356 cm), a combined width 74 at one end of about 30-50 inches (about 76-127 cm), and a combined width 76 at the opposite end of about 15-25 inches (about 38-64 cm). In some embodiments, width 74 may change to width 76, in a funnel-like manner, at a distance 78 of about 25-40 inches (about 64-102 cm) from one end of the heating pad 30. In some embodiments, the cavity 46 may have a length 82 of about 30-40 inches (about 76-102 cm) and a width 84 of about 2-7 inches (about 5-18 cm).

The heating pad 40 may be attached to the landing surface 30 in any manner. In some embodiments, the heating pad 40 may be removably attached to the landing surface 30 (e.g., clips, fasteners, straps, etc.). In some embodiments, bolts extending through bolt holes 44 provided on the heating pad 40 (e.g., along its periphery) and the landing surface 30 may removably attach the heating pad 40 to the landing surface 30. Removably attaching the heating pad 40 to the charging interface 16 enables the heating pads 40 to be attached only to buses 10 that require them, thus saving cost. For example, buses operating in a warm region of the country may not need heating pads 40, and buses operating in a cold region may need heating pads 40. Further, removably attaching the heating pad 40 to the charging interface 16 using bolts enables the heating pads 40 to be removed for repairs or replaced quickly and efficiently. In some embodiments, a gasket (not marked) may be provided (e.g., at the perimeter of heating pad 40) to minimize (or prevent) intrusion or water under the heating pad 40. In some embodiments, the gasket may also create a physical air gap between the heating elements and the composite bus body surface. An air gap may allowing for higher temperatures on the heating pad 40 while staying under the temperature limits of the composite material.

In some embodiments, heating pad 40 may include temperature sensors 52 (thermocouples, thermistors, etc.) incorporated therein. These temperature sensors 52 may be configured to measure a temperature of the heating pad 40 (which may correspond to a surface temperature of the landing surface 30). Any number of sensors 52 may be incorporated in the heating pad 40. In some embodiments, these sensors 52 may be embedded in a polymer layer (e.g., layer 64A) during vulcanization. It is also contemplated that other sensors (e.g., sensors to detect ice formation, weight of formed ice, etc.) may be incorporated in the heating pad 40. In some embodiments, heating pad 40 may include wires and/or connectors extending from the heating element 66 and the sensors 52. The wires and/or the connectors from the heating element 66 may be electrically connected to the batteries 14 (or another power source) of the bus 10 to provide power for heating. The wires and/or the connectors from the sensors 52 may be connected to a control system (described later) to control the heating.

Although the heating pad 40 is described as covering substantially the entire area of the landing surface 30, this is not a requirement. In some embodiments, the heating pads 40 may only cover selected areas of the landing surface 30. For example, in some embodiments, the heating pad 40 may only extend over a front portion (e.g., the landing zone 32) of the landing surface 30. It is also contemplated that, in some embodiments, different types of heating pads may be attached to different sections of the landing surface 30. For example, a heating pad having a higher heating capacity may be attached to a front portion of the landing surface 30, and a heating pad having a smaller heating capacity may be attached to a rear portion of the landing surface 30.

Figure 5:
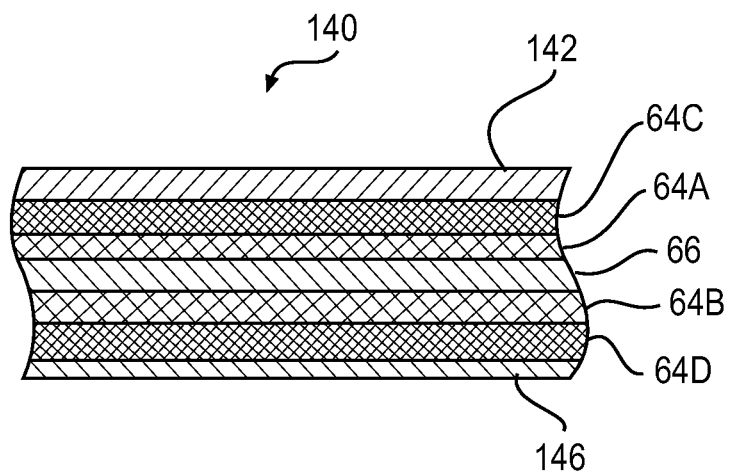
FIG. 5 is a cross-sectional view of another exemplary heating pad used in the charging interface of FIG. 2.

In some embodiments, the heating pad may be configured as a flexible sheet. FIG. 5 illustrates a cross-sectional view of an exemplary heating pad 140 in the form of a flexible sheet. Heating pad 140 may be formed with a heating element 66 embedded between several layers of polymer sheets. In the embodiment illustrated in FIG. 5, the heating element 66 is sandwiched between two polymer sheets (64A, 64C) on the top and two polymer sheets (64B, 64D) on the bottom. In other embodiments, a different number of polymer sheets may be used. The added polymer sheets may increase the water resistance of the heating pad 140. An abrasion resistant layer 142 (e.g., a telfon sheet, etc.) may be provided on top of polymer sheet 64C to provide abrasion resistance to the heating pad 140. In some embodiments, an adhesive layer 146 (e.g., a pressure sensitive adhesive layer) may be provided as the bottom layer of the heating pad 140 to attach the heating pad 140 to the landing surface 30. In some embodiments, the thickness of each polymer sheet (64A, 64B, 64C, 64D) may be between about 0.025-0.075 inches (about 0.06-0.19 cm), and the thickness of the abrasion resistant layer 142 may be between about 0.01-0.05 inches (about 0.025-0.13 cm).

Heating pad 140 may be formed by any method. In some embodiments, the heating element 66 with polymer sheets (64A, 64B, 64C, 64D) on either side, and an abrasion resistant layer 142 on the top may be vulcanized to form an integral unit. The adhesive layer 146 may then be applied to the back side of the heating pad 140. The heating pad 140 may then be attached to the landing surface by the application of pressure. Heating pad 140 may also include sensors (sensor 52, rain sensor, etc.) embedded thereon.

In some embodiments, in addition to the heating pads (40, 140) on the landing surface 30, heating elements (heating pads, heating elements, etc.) may also be incorporated at other locations of the charging interface 16 (e.g., electrodes of the charging blade 20). In some embodiments, a heating device (similar to heating device 60 of FIG. 4) may be vulcanized to the back of an electrode (first electrode 28A, second electrode 28B, pilot electrode 26, and/or ground electrode 24) to heat the electrode and melt any ice formed thereon. In some embodiments, heating pads may be incorporated at other locations (e.g., proximate the electrodes) of the charging interface 16. For example, one or more heating pads may be attached around the electrodes to melt any frozen precipitation thereon.

Figure 6:
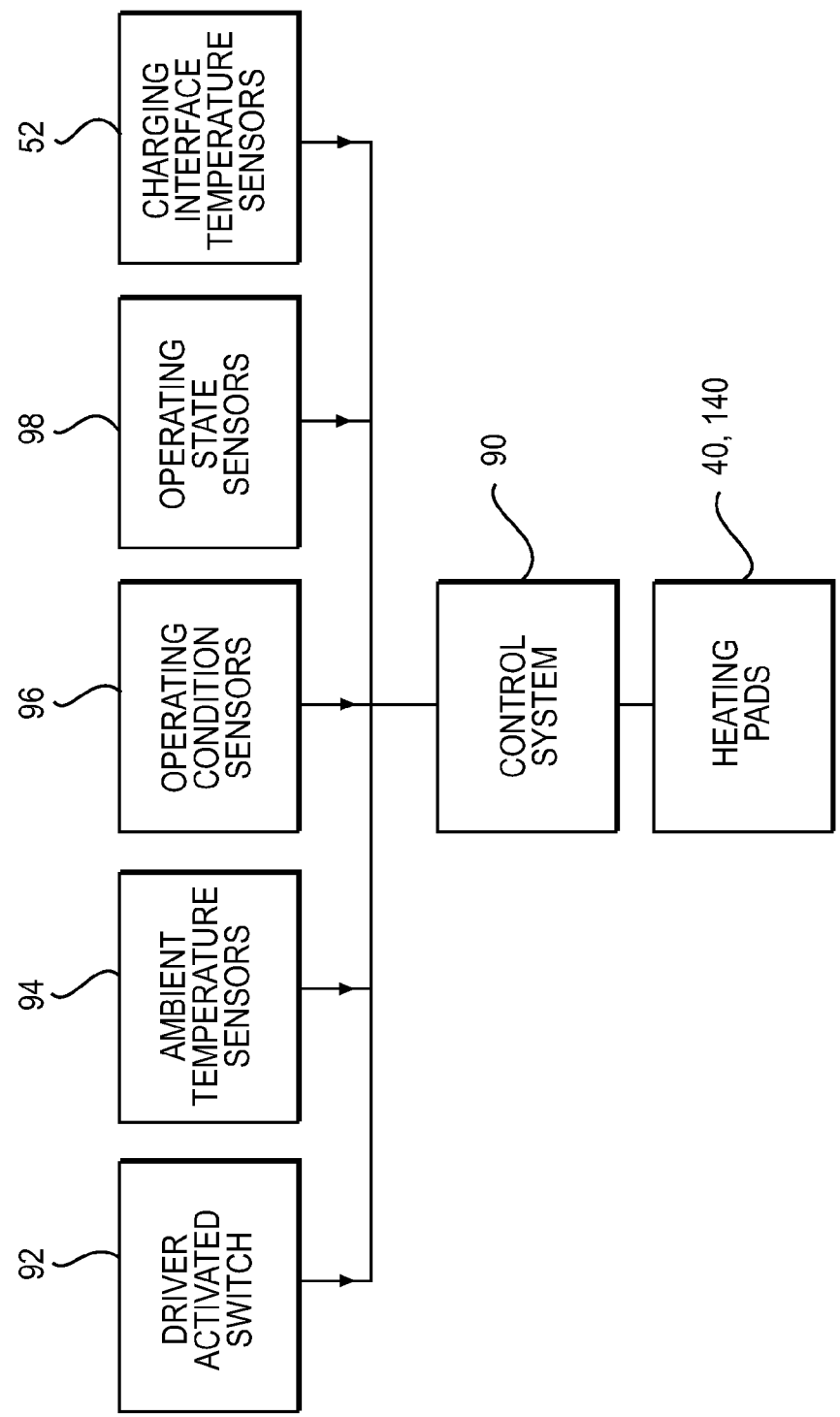
FIG. 6 is an exemplary control system that may control the heating pad in the charging interface of FIG. 2.

After attachment of the heating pads 40, 140 to the charging interface 16 of the bus 10, the heating element 66 and the sensors 52 of the heating pads (40, 140, on the electrodes, etc.) may be coupled to a control system of the bus 10. The control system may selectively operate the heating pad 40, 140 based on readings from the sensor. FIG. 6 illustrates a schematic illustration of an exemplary control system 90 that may be used to control the heating pads 40, 140 on bus 10. Control system 90 may be part of a device that controls several operations (for example, HVAC control, door opening/closing, kneeling, etc.) of the bus 10. As is known in the art, control system 90 may include a collection of mechanical, electrical, and electronic devices (for example, computational units, A/D converters, memory, switch, valves, actuators, fuses, etc.) that collectively perform the functions of control system 90. Although control system 90 is illustrated as a single system, in some embodiments, the functions of control system 90 may be divided across multiple controllers (body controller, powertrain controller, traction motor controller, etc.) of the bus 10.

Control system 90 may selectively operate the heating pads 40, 140 based on input from several sensors. These sensors may include one or more of: a driver activated switch 92; ambient temperature sensors 94; safe operating condition sensors 96; operating state sensors 98; and temperature sensors 52. Other types of sensors, such as, for example, a precipitation sensor, etc. may also be used. These sensors may be used individually or together with other sensors (e.g., precipitation sensor together with temperature sensor). Switch 92 may be provided in the driver cab of the bus 10. The driver may activate the switch 92 to activate the heating pad 40, 140. The ambient temperature sensors 94 may provide ambient temperature related data to the control system 90. For safety (or other) reasons, it may not be desirable to activate the heating pads 40, 140 when certain conditions exist (e.g., when the charging interface is open, etc.). The safe operating condition sensors 96 may provide data related to these conditions to the control system 90. Operating state sensors 98 may provide data related to the operating conditions (e.g., stationary, moving, gear, speed, etc.) of the bus to the control system 90. The temperature sensors 52 provides data related to the temperature of the charging interface 16 to the control system 90. Control system 90 may control the operation of the heating pads 40, 140 based on input from some or all of these sensors.

Based on input from the sensors, the control system 90 may direct the heating pads 40, 140 to heat to an amount sufficient to melt the ice formed on the charging interface 16. That is, control system 90 may provide the heating pads 40, 140 with an amount of electrical energy needed to melt the ice on the charging interface 16. In some embodiments, the amount of energy directed to the heating pads 40, 140 may be predetermined and programmed into the control system 90. For example, based on experience, it may be known that an average snow fall rate in an area is about 1"/hr. Based on this known snow fall rate, the weight of snow expected to deposit on the charging interface 16 per hour (or any amount of time), and the amount of electrical energy needed to melt this deposited snow (i.e., $m_{ice} \times c_p \times \Delta T$) may be determined, and programmed into the control system 90. When the sensors indicate that heating of the charging interface 16 is desired, the control system 90 may direct the programmed energy to the heating pads 40, 140. It is also contemplated that, in some embodiments, bus 10 may include a sensor to detect the amount of ice on the charging interface 16, and the control system 90 may compute the amount of energy needed to melt the detected amount of ice.

Figure 7:
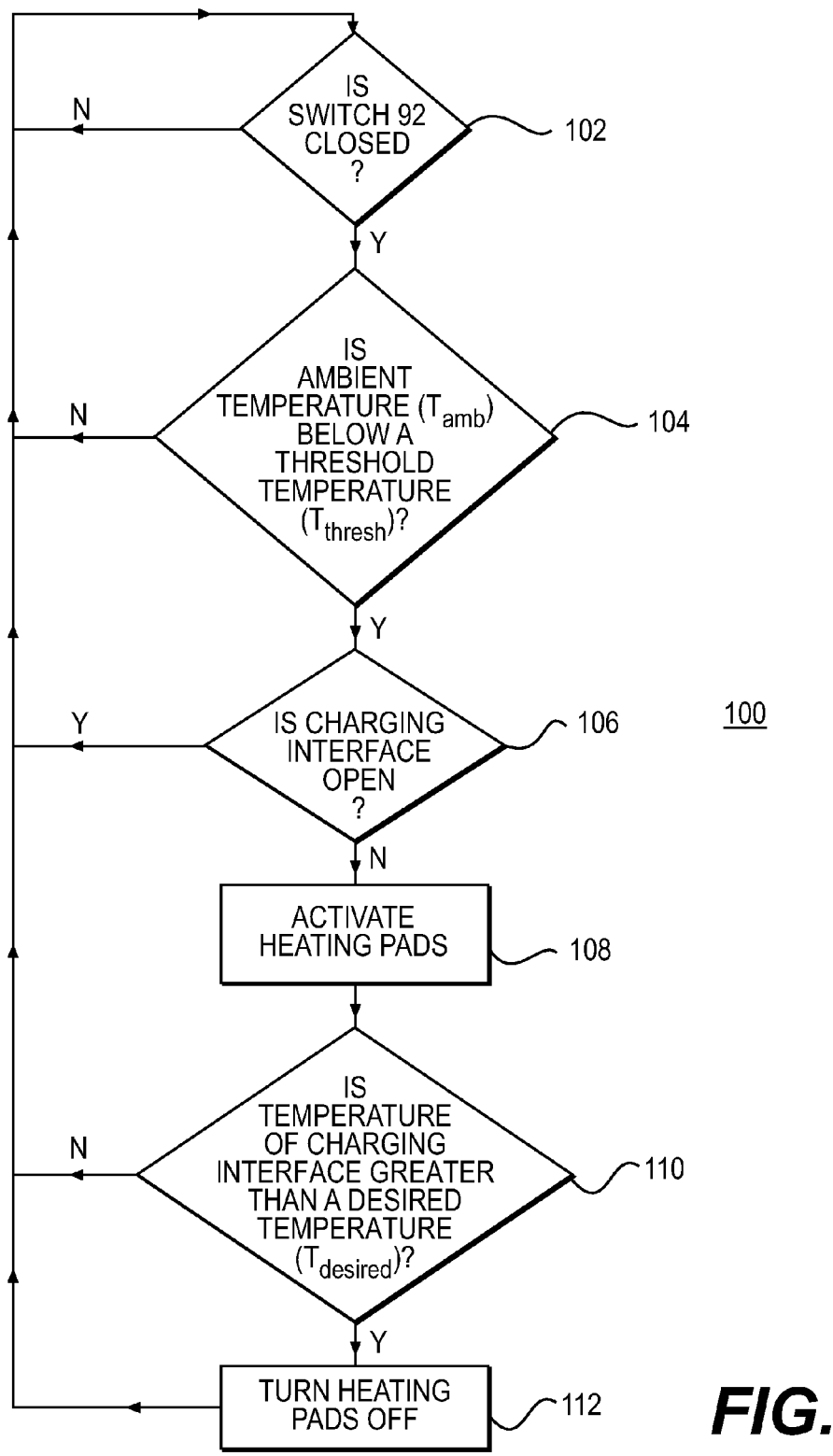
FIG. 7 is an exemplary method of operating the heating pad in the charging interface of FIG. 2.

FIG. 7 is a flow chart that illustrates an exemplary method 100 used by the control system 90 to control the heating pads 40, 140. When switch 92 is closed (step 102), and the ambient temperature $T_{amb}$ is below a threshold temperature $T_{thresh}$ (step 104), the control system 90 may check to determine if the charging interface 16 is open or if any other conditions make it unsafe to activate the heating pads 40, 140 (step 106). If the charging interface 16 is closed, and no safety concerns exists, the control system 90 may activate the heating pads (step 108). The control system 90 may activate the heating pads 40, 140 by directing an amount of energy sufficient to melt the ice on the charging interface 16 to the heating elements 66 of the heating pads 40, 140. The control system 90 may then monitor the temperature sensors 52 to determine if the temperature of the charging interface 16 (or the heating pads) exceeds a desired temperature $T_{desired}$ (step 110). If the charging interface temperature is below $T_{desired}$, the control system 90 may continue to heat the heating pads 40, 140 until the desired temperature is reached. When the desired temperature is reached, the control system 90 may deactivate the heating pads 90. The desired temperature may be a maximum operating temperature of the charging interface 16.

In some embodiments, the control system 90 may activate the heating pads 40, 140 only if further, or additional, conditions are met. For instance, alternate to or in addition to the conditions described above (e.g., steps 102, 104, 106) the control system 90 may check the operating state of the bus, and activate the heating pads 40, 140 only when the bus 10 is in a selected gear (or in preselected operating state, e.g., moving as opposed to stationary, etc.). In some embodiments, the control system 90 may also check to determine if the temperature sensors (e.g., temperature sensor 52) and/or other systems are operational before the heating pads 40, 140 are activated (step 108). The conditions that the control system 90 checks before activation of the heating pads 40, 140, the threshold temperature ($T_{thresh}$) below which the control system 90 will not activate the heating pads 40, 140, and the desired temperature ($T_{desired}$) to which the charging interface 16 will be heated may be programmed parameters of the control system 90.

In some embodiments, the control system 90 may selectively control the operation of the heating pads 40, 140 by other methods. Some of these methods are described in co-assigned U.S. patent application Ser. No. 14/670,027, filed Mar. 26, 2015, which is incorporated by reference in its entirety herein. In some embodiments, charging interface 16 may also include features for water control. As ice and snow on the charging interface 16 is melted, water may collect (or pool up) on the landing surface 30 (or at other locations) and interfere with the proper operation of the charging interface 16. The features of water control may include gutters, drain holes, or other features that allows the water to drain (or flow off) from the charging interface 16. In some embodiments, accumulated water on or near a heating pad may be a reliability concern since the water may permeate the silicone and affect its reliability. Incorporating water control features like gutters and run-off channels may help prevent this. In some embodiments, the heating pad (or components of the heating pad, such as, for example, plate 42) may be supported by a grid structure rather than a solid surface to ensure that no water gets trapped under it.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

We claim:

1. An electric bus, comprising:
a charging interface positioned on an external surface of the electric bus, the charging interface being configured to engage with a charging head of an external charging station to charge the bus; and
one or more heating pads removably attached to the charging interface and configured to heat the charging interface, the heating pads including:
a rigid plate forming an exposed surface of the charging interface, the plate being positioned such that a first side of the plate forms a charging head contact surface when the charging head engages with the charging interface; and
a heating device attached to a second side of the plate opposite the first side, the heating device including a heating element configured to heat the plate by resistive heating.

2. The bus of claim 1, wherein the charging interface is positioned on a roof of the bus.

3. The bus of claim 1, wherein the heating device is a polymer encapsulated heating element.

4. The bus of claim 1, wherein the heating pad includes one or more sensors incorporated thereon, the one or more sensors including at least one of a temperature sensor and a precipitation sensor.

5. The bus of claim 1, wherein the plate includes aluminum.

6. The bus of claim 1, wherein the heating device is vulcanized to the second side of the plate.

7. The bus of claim 1, further including a control system configured to selectively operate the one or more heating pads when an ambient temperature decreases below a threshold value.

8. The bus of claim 7, wherein the control system is configured to operate the heating pads to melt ice on the charging interface.

9. The bus of claim 1, wherein the charging interface includes one or more electrodes positioned between a pair of rails symmetrically positioned about a longitudinal of the bus, the pair or rails forming a funnel shaped alignment scoop located upstream of the one or more electrodes such that the funnel shaped alignment scoop is configured to direct the charging head towards the one or more electrodes when the charging head engages with the charging interface, and wherein the one or more heating pads are positioned between the pair of rails.

10. The bus of claim 9, wherein at least one of the one or more electrodes includes a second heating device vulcanized to a surface of the at least one electrode, the second heating device being configured to heat the at least one electrode.

11. An electric bus, comprising:
a charging interface positioned on a roof of the bus;
one or more heating pads removably attached to the charging interface and configured to heat the charging interface, the heating pads including:
a metal plate having a first side and a second side opposite the first side, the first side being a surface exposed to atmosphere;
a heating device attached to the second side of the plate, the heating device including a polymer encapsulated resistive heating element; and
a control system configured to selectively operate the one or more heating pads to melt ice on the charging interface when an ambient temperature is below a threshold value.

12. The bus of claim 11, wherein the metal plate includes aluminum having a thickness between about 0.1 to 0.15 inches (about 0.25 to 0.38 cm).

13. The bus of claim 11, wherein the one or more heating pads are vulcanized to the second side of the plate.

14. The bus of claim 11, wherein the control system is configured to selectively operate the one or more heating pads when the ambient temperature is below the threshold value and a driver operated switch is activated.

15. The bus of claim 11, wherein the charging interface further includes one or more electrodes, and wherein at least one of the one or more electrodes includes a second heating device attached thereto.

16. The bus of claim 11, wherein the control system is configured to stop heating the one or more heating pads when a temperature of the one or more heating pads exceeds a threshold value.

17. A method of operating an electric bus, comprising:
driving the electric bus, the electric bus including a charging interface on a roof and a heating pad removably attached to the charging interface, the heating pad including a metal plate having a first side exposed to atmosphere and an opposite second side with a polymer encapsulated heating element attached thereto;
detecting an ambient temperature; and
activating the heating pad to heat the charging interface when the detected ambient temperature is below a threshold value.

18. The method of claim 17, further including detecting a status of a driver operated switch, wherein the activating further includes activating the heating pad when the switch is activated.

19. The method of claim 17, further including deactivating the heating pad when a temperature of the heating pad exceeds a threshold temperature.

20. The method of claim 17, wherein activating the heating pad includes directing a sufficient amount of energy to the heating pad to melt ice on the charging interface.

* * * * *